United States Patent [19]
Nomura et al.

[11] Patent Number: 5,190,119
[45] Date of Patent: Mar. 2, 1993

[54] HYDRAULIC POWER STEERING DEVICE RESPONSIVE TO SPEED OF VEHICLE

[75] Inventors: Keiji Nomura, Nara; Katsutoshi Nishimura, Osaka; Kazunori Okamoto, Osaka; Tomoharu Horiuchi, Osaka; Masayuki Watanabe, Kyoto; Hirohisa Nakao, Osaka; Masahiko Noguchi, Osaka, all of Japan

[73] Assignee: Koyo Seiko Co., Ltd., Osaka, Japan

[21] Appl. No.: 674,115

[22] Filed: Mar. 25, 1991

[30] Foreign Application Priority Data

Apr. 16, 1990 [JP] Japan .................. 2-40450[U]
Nov. 7, 1990 [JP] Japan .................. 2-117582[U]
Nov. 9, 1990 [JP] Japan .................. 2-117788[U]

[51] Int. Cl.⁵ .................................... B62D 5/06
[52] U.S. Cl. ...................... 180/132; 180/141; 91/375 A
[58] Field of Search ............ 180/132, 141, 142, 143, 180/149; 91/375 A

[56] References Cited

U.S. PATENT DOCUMENTS

| | | |
|---|---|---|
| 4,796,715 | 1/1989 | Futuba et al. |
| 4,957,468 | 9/1990 | Otsuka et al. ............ 464/2 X |
| 5,016,723 | 5/1991 | Sano ....................... 180/143 |
| 5,070,957 | 12/1991 | Harkrader et al. ......... 180/141 |

FOREIGN PATENT DOCUMENTS

| | | |
|---|---|---|
| 299617 | 1/1989 | European Pat. Off. |
| 302267 | 2/1989 | European Pat. Off. |
| 3516219 | 11/1985 | Fed. Rep. of Germany |
| 3625600 | 2/1987 | Fed. Rep. of Germany |
| 61-200063 | 9/1986 | Japan |
| 61-211169 | 9/1986 | Japan |

Primary Examiner—Margaret A. Focarino
Assistant Examiner—Kevin Hurley

[57] ABSTRACT

A hydraulic power steering device responsive to the speed of a vehicle and comprising a housing, an output shaft disposed in the housing, an input shaft disposed in the housing and coaxial with the output shaft, a torsion bar provided between the output shaft and the input shaft, a control valve provided around the input shaft for controlling the amount of pressure oil to be supplied from a hydraulic pump to a power cylinder in accordance with the torsion of the torsion bar, and plungers each slidably fitted in a hole formed in the output shaft, each of the plungers being adapted to be pressed at its forward end against the input shaft by oil pressure in accordance with the vehicle speed to obtain a reaction. At least one of the portion of the plunger slidable in contact with the inner peripheral surface of the output shaft defining the hole and the portion of the plunger to be pressed into contact with the input shaft is made of a synthetic resin.

8 Claims, 6 Drawing Sheets

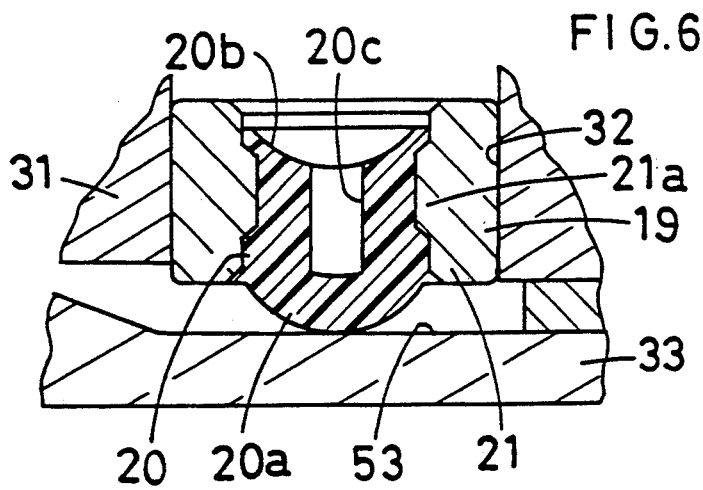
FIG. 6
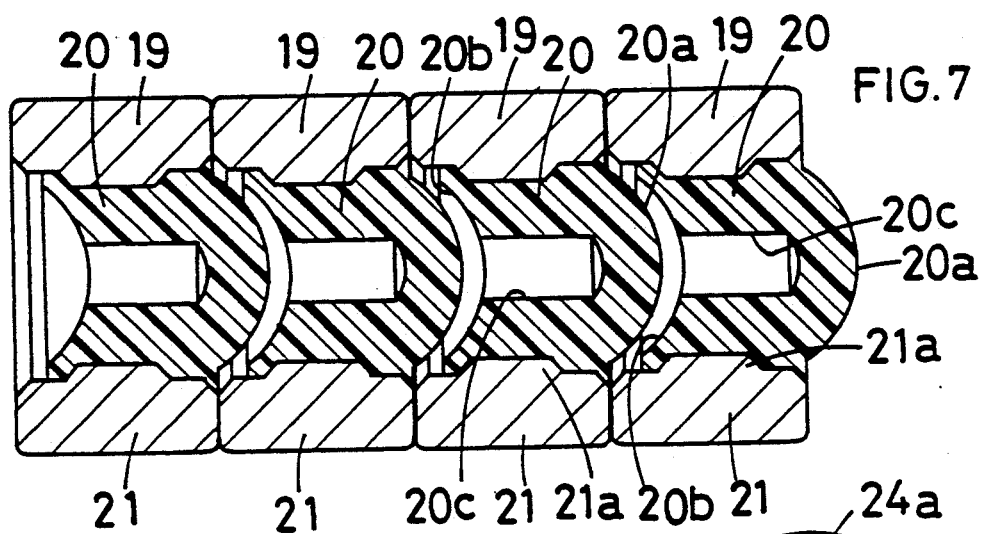
FIG. 7
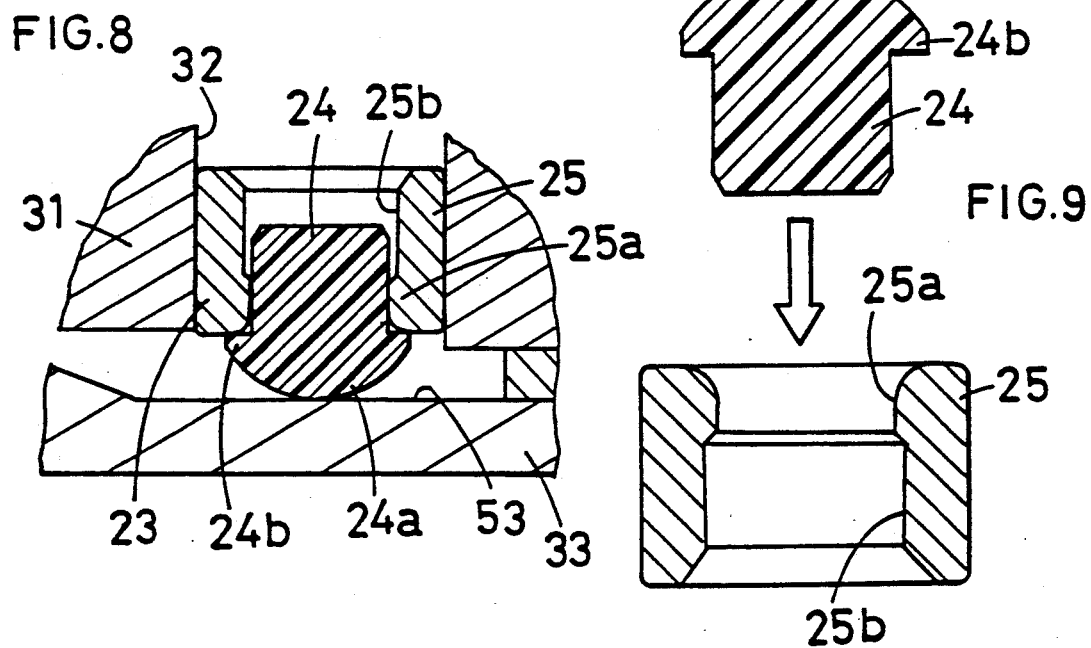
FIG. 8
FIG. 9

HYDRAULIC POWER STEERING DEVICE RESPONSIVE TO SPEED OF VEHICLE

BACKGROUND OF THE INVENTION

The present invention relates to a hydraulic power steering device, for example, for use in motor vehicles which is responsive to the speed of the vehicle.

Throughout the specification, the right-hand side of FIG. 10 will be referred to as "front," and the left-hand side thereof as "rear."

In the following description, like parts are designated by like reference numerals throughout the drawings.

The specification of U.S. Pat. No. 4,796,715 discloses a vehicle speed responsive hydraulic power steering device which has heretofore been used in motor vehicles. The device is shown in FIGS. 10 to 13. With reference to FIGS. 10 to 13, the conventional power steering device comprises an output shaft 31 disposed within a housing 30 and having a tubular rear portion 31a extending axially of the shaft. The tubular portion 31a is formed with a plurality of holes 32 extending radially through its peripheral wall and arranged circumferentially thereof at a specified spacing. Provided inside the housing 30 is a hollow input shaft 33 inserted at its front portion in the tubular portion 31a of the output shaft 31 and coaxial with the output shaft 31. A torsion bar 34 is provided between the output shaft 31 and the input shaft 33 so as not to rotate relative to these shafts 31, 33 about the axis thereof.

The front portion of the output shaft 31 is integral with a pinion 36 having teeth meshable with the rack of a rack bar 35 for steering the front wheels. The input shaft 33 is connected to a steering shaft carrying an unillustrated steering wheel. Provided around the input shaft 33 is a rotary valve 37 (control valve) having a valve body 37a secured to the output shaft 31. Owning to a relative angular displacement occurring between the input shaft 33 and the output shaft 31 due to the torsion of the torsion bar 34, the rotary valve 37 is adapted to introduce pressure oil, which is forwarded thereto by a hydraulic pump 38 driven, for example, by the rotation of the engine, into the housing 30 via a conduit 39 and an inlet port 40 in the housing 30, to supply the oil selectively to one of the two ports of an unillustrated power cylinder and to control the amount of supply.

A plunger 41 made of a metal material, such as JIS SUJ2 as hardened, is fitted in each hole 32 in the tubular portion 31a of the output shaft 31 and is slidable axially of the hole 32. The end of the plunger 41 closer to the input shaft 33 is integrally formed with a spherical protuberance 41a. Positioned in coincidence with the holes 32 is an annular groove 42 formed in the outer periphery of the output shaft 31 over the entire circumference thereof. A split ring 43 is fitted in the annular groove 42 for restraining the plungers 41 from moving radially outward.

An annular groove 44 is also formed in the inner periphery of the housing 30 over the entire circumference thereof and is opposed to the holes 32. On the front and rear sides of the groove 44, annular grooves 45 are formed in the outer periphery of the output shaft 31 over the entire circumference thereof. An O-ring 46 and a seal ring 47 are fixedly fitted in each of these grooves 45. Thus, a pressure oil chamber 48 is formed. A branch pipe 49 branching from the conduit 39 and communicating with the pressure oil chamber 48 is provided with a hydraulic reaction control valve 52 controllable by a control unit 51 in accordance with the vehicle speed detected by a vehicle speed sensor 50.

The periphery of the input shaft 33 is formed with a plurality of furrows 53 extending axially of the shaft, arranged at a specified spacing circumferentially thereof and opposed to the respective holes 32. Each of the furrows 53 is defined by a flat bottom surface 53a and opposite side surfaces 53b extending radially outward and inclined circumferentially outward.

The pressure oil is introduced into the pressure oil chamber 48 in accordance with the vehicle speed, whereby the spherical protuberances 41a at the inner ends of the plungers 41 are pressed against the inner surfaces of the respective furrows 53 in the periphery of the input shaft 33 to increase the steering torque required for rotating the input shaft 33 about its axis. The reaction pressure to be applied to the plungers 41 increases with the steering pressure to be given to the power cylinder.

FIG. 14, the solid lines represent the relationship between the steering torque and the steering pressure, i.e., steering characteristics, of the vehicle during running at a high speed. Stated more specifically, suppose the steering wheel is turned to rotate the input shaft 33, for example, counterclockwise in FIGS. 12 and 13. In this case, the steering torque only increases initially. When the input shaft 33 has rotated through a predetermined angle, the torsion bar 34 is twisted, increasing the steering pressure within one of the pressure oil chambers of the power cylinder At the same time, the reaction pressure to be given to the plungers 41 and the steering torque increase linearly (see FIG. 14, line A). At this time, each of the plungers 41 slightly slides in the hole 32 radially outward, with its protuberance 41a sliding on the bottom surface 53a of the furrow 53 rightward in FIG. 13.

When the input shaft 33 is further rotated, the torsion bar 34 is twisted to a greater extent to give a greater steering pressure. However, an unillustrated pressure control valve functions to keep the reaction pressure constant and thereby prevent the increase in the steering torque (see FIG. 14, line B). At this time, the spherical protuberance 41a of each plunger 41 slides up the inclined side surface 53b of the furrow 53, moving the plunger 41 radially outward within the hole 32.

Upon the steering pressure reaching a point X in FIG. 14, an unillustrated relief valve functions so as not to increase the steering pressure above the value. The output shaft 31 starts to rotate counter-clockwise to decrease the steering torque (see FIG. 14, line C). This movement slightly slides down the protuberance 41a of the plunger 41 along the inclined side surface 53b of the furrow 53 to slightly slide the plunger 41 radially inward in the hole 32.

After the steering torque has reached a point Y in FIG. 14, the steering pressure only diminishes (see FIG. 14, line D). At this time, the output shaft 31 further rotates counterclockwise, causing the plunger protuberance 41a to slide down the inclined side surface 53b of the furrow 53 to the lower end thereof to move the plunger 41 radially inward inside the hole 32.

The steering pressure decreases to a point Z, whereupon the reaction pressure also decreases with the decrease of the steering pressure, and the steering torque decreases linearly along with the steering pressure and the reaction pressure (see FIG. 14, line E). At this time, the plunger protuberance 41a slides on the furrow bottom surface 53a leftward in FIG. 13, and the plunger 41 slides radially inward within the hole 32. In this way, the front wheels are steered through a specified angle.

In a low-speed running state, no reaction pressure is applied to the plungers 41, and the input shaft 33 is rotated with a small steering torque to twist the torsion bar 34 and supply the pressure oil to the power cylinder.

However, the conventional power steering device has a problem. Since each plunger 41 is made entirely of metal, a great frictional force occurs when the spherical protuberance 41a slides on the bottom surface 53a and the side surface 53b of the furrow 53 and also when the plunger 41 slides axially of the hole 32, with the result that the steering characteristics shown in FIG. 14 involve great hysteresis to give an impaired steering feeling.

Further in an equilibrated state wherein no oil pressure is applied to the plunger 41 as when the vehicle is at a stop or is running at a low speed, another problem is encountered in that the plunger 41 moves within the hole 32 to produce a striking noise when the plunger 41 is forced against the input shaft 33 on steering. Additionally, the device has the problem that upon the application of oil pressure to the plunger 41 in the equilibrated state, the plunger 41 abruptly moves in the radial direction into impinging contact with the input shaft 33 to give off a striking noise. Especially, the plunger 41, which is made of metal and has a great weight, produces a great striking noise.

An object of the present invention is to solve the foregoing problems and to provide a vehicle speed responsive hydraulic power steering device which gives a more excellent steering feeling than the conventional device.

Another object of the invention is to provide a vehicle speed responsive hydraulic power steering device wherein the plungers are adapted to strike on the input shaft with a diminished noise.

Other objects of the invention will be readily understood from the following description.

The hydraulic power steering device responsive to the speed of a vehicle and embodying the present invention comprises a housing, an output shaft disposed in the housing, an input shaft disposed in the housing and coaxial with the output shaft, a torsion bar provided between the output shaft and the input shaft, a control valve provided around the input shaft for controlling the amount of pressure oil to be supplied from a hydraulic pump to a power cylinder in accordance with the torsion of the torsion bar, and plungers each slidably fitted in a hole formed in the output shaft, each of the plungers being adapted to be pressed at its forward end against the input shaft by oil pressure in accordance with the vehicle speed to obtain a reaction, at least one of the portion of the plunger slidable in contact with the inner peripheral surface of the output shaft defining the hole and the portion of the plunger to be pressed into contact with the input shaft being made of a synthetic resin.

Examples of plungers for use in the power steering device described above includes a plunger which is entirely made of a synthetic resin; a plunger comprising a synthetic resin body having a portion slidable in contact with the hole-defining inner peripheral surface of the output shaft, and an input shaft contacting metal ball fixed in the synthetic resin body; a plunger comprising a synthetic resin body having a portion slidable in contact with the hole-defining inner peripheral surface of the output shaft, and an input shaft contacting metal ball rollably attached to the synthetic resin body; and a plunger comprising a synthetic resin body, and an annular metal body secured to the periphery of the synthetic resin body and having an outer peripheral surface slidable in contact with the hole-defining inner peripheral surface of the output shaft, one end of the synthetic resin body closer to the input shaft being projected beyond one end of the annular metal body closer to the input shaft to provide a protuberance for contact with the input shaft.

With the vehicle speed responsive hydraulic power steering device of the present invention, at least one of the plunger portion slidable in contact with the hole-defining inner surface of the output shaft and the plunger portion to be pressed into contact with the input shaft is made of a synthetic resin. This reduces the sliding friction between the plunger and the furrow bottom surface and side surfaces of the input shaft and/or the sliding friction between the plunger and the hole-defining surface of the output shaft. Moreover, the plunger is smaller in weight than the conventional one which is made entirely of a metal material. Consequently, the hysteresis of the steering characteristics is smaller than in the prior art, permitting the rotation of the output shaft to follow the rotation of the steering wheel more effectively to give an improved steering feeling. The lightweight plunger further diminishes the noise to be produced by the striking contact of the plunger with the input shaft due to the movement of the plunger.

The present invention will be described in greater detail with reference to the accompanying drawings.

BRIEF DESCRIPTION OF THE DRAWINGS

FIG. 6 is a sectional view corresponding to FIG. 2 and showing a sixth embodiment of the invention;

FIG. 7 is a longitudinal section of plunger annular metal bodies of the sixth embodiment to show how to polish the outer peripheral surfaces of the metal bodies;

FIG. 8 is a sectional view corresponding to FIG. 2 and showing a seventh embodiment of the invention;

FIG. 9 is an exploded view in vertical section of the plunger of the seventh embodiment;

DESCRIPTION OF THE PREFERRED EMBODIMENTS

Figure 1:
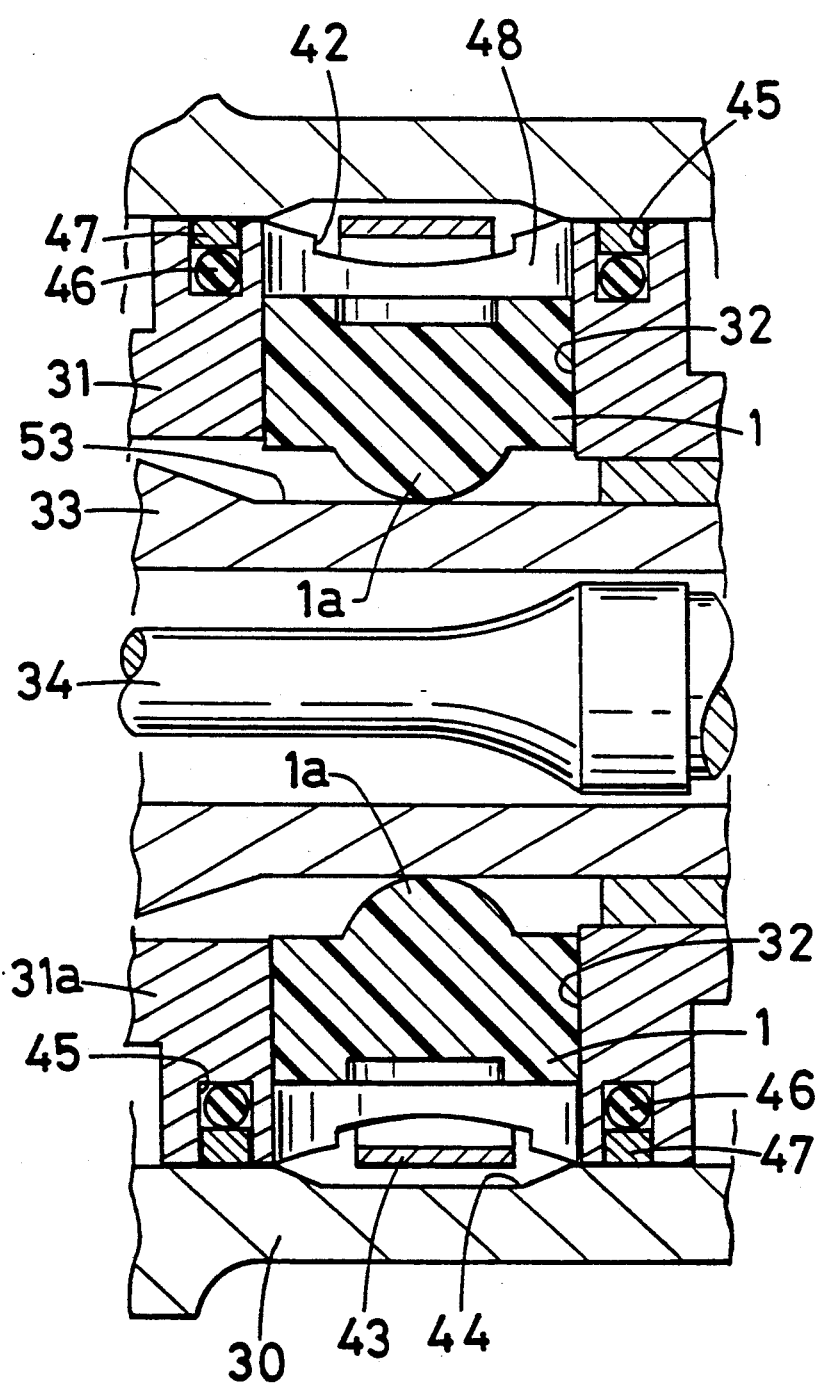
FIG. 1 is an enlarged fragmentary view in vertical section showing a vehicle speed responsive hydraulic power steering device as a first embodiment of the invention.

In the following description, the same parts as those shown in FIGS. 10 to 13 will be designated each by the same corresponding reference numeral and will not be described repeatedly.

With reference to FIG. 1 showing a first embodiment of the present invention, i.e., a hydraulic power steering device responsive to the speed of a vehicle, the device includes plungers 1 each in the form of a solid cylinder and made entirely of a synthetic resin such as phenol resin. Each of the plungers 1 is integrally formed, at the end thereof toward the input shaft 33, with a spherical protuberance 1a, which serves as the portion to be pressed into contact with the bottom surface 53a and the side surface 53b defining the furrow 53 of the input shaft 33. Except for the above feature, the first embodiment has the same construction as the conventional power steering device already described.

Figure 14:
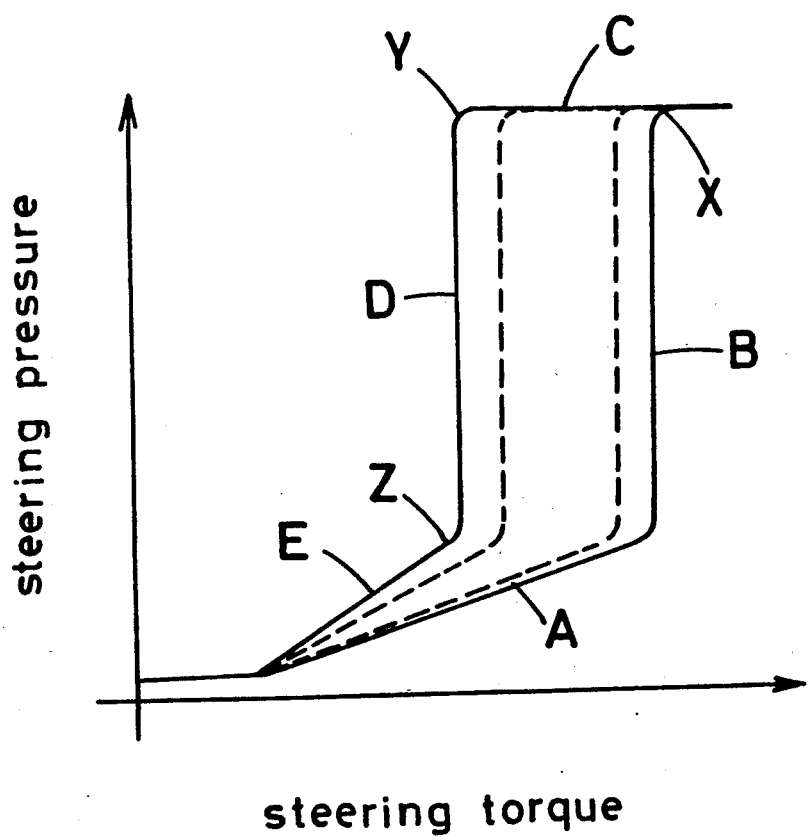
FIG. 14 is a diagram showing the relationship between the steering torque and the steering pressure during steering.

With the power steering device, the synthetic resin used for the plunger 1 diminishes the sliding friction between the plunger protuberance 1a and the furrow bottom surface 53a and side surfaces 53b, and also diminishes the sliding friction between the peripheral surface of the plunger 1 and the inner peripheral surface defining the hole 32 formed in the output shaft 31. This reduces the hysteresis of the relationship between the steering torque and the steering pressure during steering, i.e., steering characteristics, as indicated in broken lines in FIG. 14, permitting the rotation of the output shaft 31 to follow the rotation of the steering wheel more effectively and giving an improved steering feeling.

Further in an equilibrated state wherein no oil pressure is applied to the plunger 1 as when the vehicle is at a stop or is running at a low speed, the plunger 1 is likely to move radially to strike against the input shaft 33 or against the split ring 43. The noise then produced is small because the striking portions of the plunger 1 are soft and also because the plunger has a reduced weight.

Figure 2:
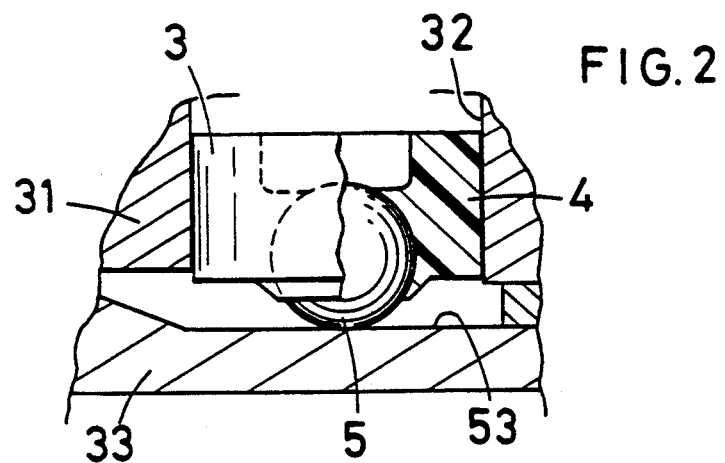
FIG. 2 is a sectional view corresponding to a portion of FIG. 1 and showing a second embodiment of the invention.

FIG. 2 shows a second embodiment of the invention. The vehicle speed responsive hydraulic power steering device shown in FIG. 2 includes plungers 3 each comprising a synthetic resin body 4 having an outer peripheral surface slidable in contact with the inner peripheral surface of the output shaft 31 defining the hole 32, and a metal ball 5 fixed in the resin body 4 and adapted to contact the input shaft 33. Except for this feature, the second embodiment has the same construction as the conventional power steering device described.

With the present power steering device, the metal ball 5 of the plunger 3 bears on the furrowed surface of the input shaft 33, so that the plunger portion is prevented from abrasion, hence a prolonged life. Except for this advantage, the second embodiment has the same advantages as the first.

Figure 3:
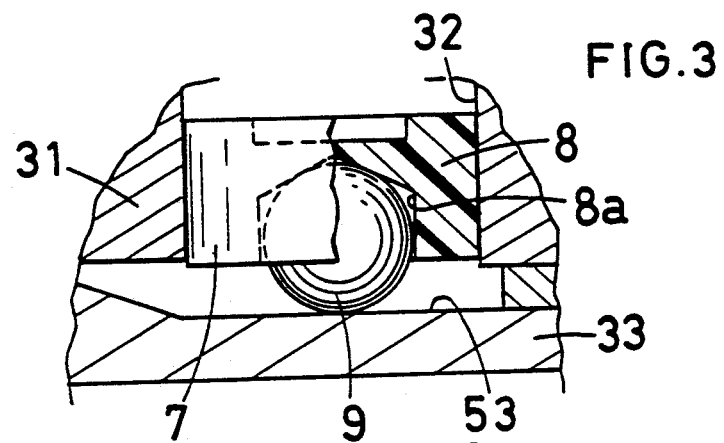
FIG. 3 is a sectional view corresponding to FIG. 2 and showing a third embodiment of the invention.

FIG. 3 shows a third embodiment of the invention. The vehicle speed responsive power steering device of FIG. 3 includes plungers 7 each comprising a synthetic resin body 8 having an outer peripheral surface slidable in contact with the inner peripheral surface of the output shaft 31 defining the hole 32, and a metal ball 9 rollably fitted in a blind bore 8a formed in the end of the resin body 8 closer to the input shaft 33 to contact the input shaft 33. With the exception of this feature, the third embodiment has the same construction as the conventional power steering device described.

With the present power steering device, the metal ball 9 is rollable relative to the resin body 8, so that when brought into contact with the inner surface of the input shaft 33 defining the furrow 53, the metal ball 9 rolls along with diminished friction between the ball 9 and the furrowed surface of the input shaft 33. Except for this advantage, the third embodiment has the same advantages as the second embodiment described.

Figure 4:
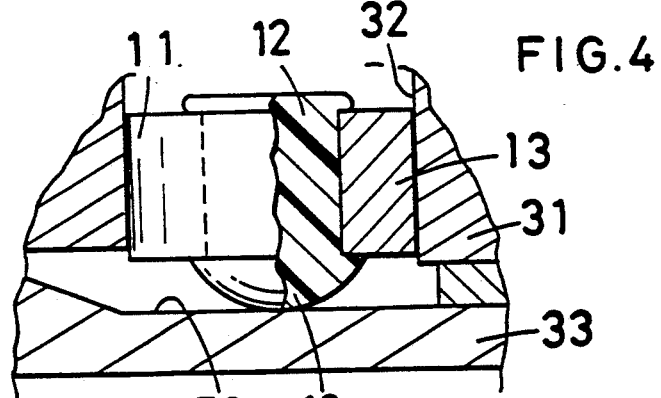
FIG. 4 is a sectional view corresponding to FIG. 2 and showing a fourth embodiment of the invention.

FIG. 4 shows a fourth embodiment of the invention. The vehicle speed responsive hydraulic power steering device of FIG. 4 includes plungers 11 each comprising a synthetic resin body 12 in the form of a solid cylinder, and an annular metal body 13 secured to the periphery of the resin body 12 and having an outer peripheral surface slidable in contact with the inner peripheral surface of the output shaft 31 defining the hole 32. The end of the resin body 12 closer to the input shaft 33 is projected beyond the corresponding end of the metal body 13 to provide a spherical protuberance 12a. The protuberance 12a serves as the portion to be brought into contact with the inner surface of the input shaft 33 defining the furrow 53. Except for this feature, the fourth embodiment has the same construction as the conventional power steering device described.

Figure 5:
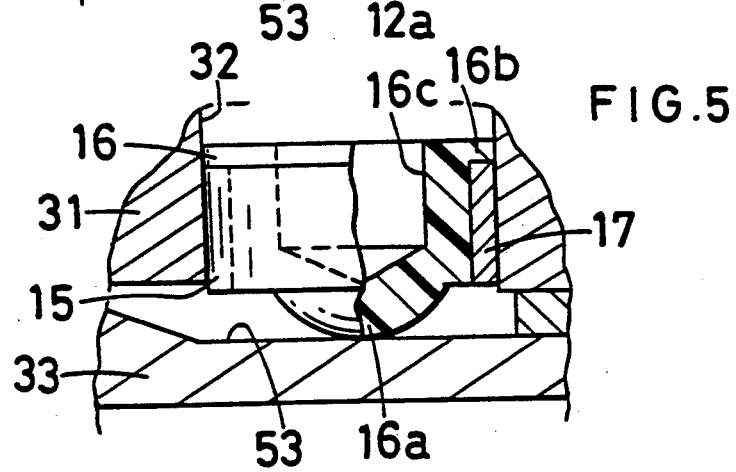
FIG. 5 is a sectional view corresponding to FIG. 2 and showing a fifth embodiment of the invention.
Figure 10:
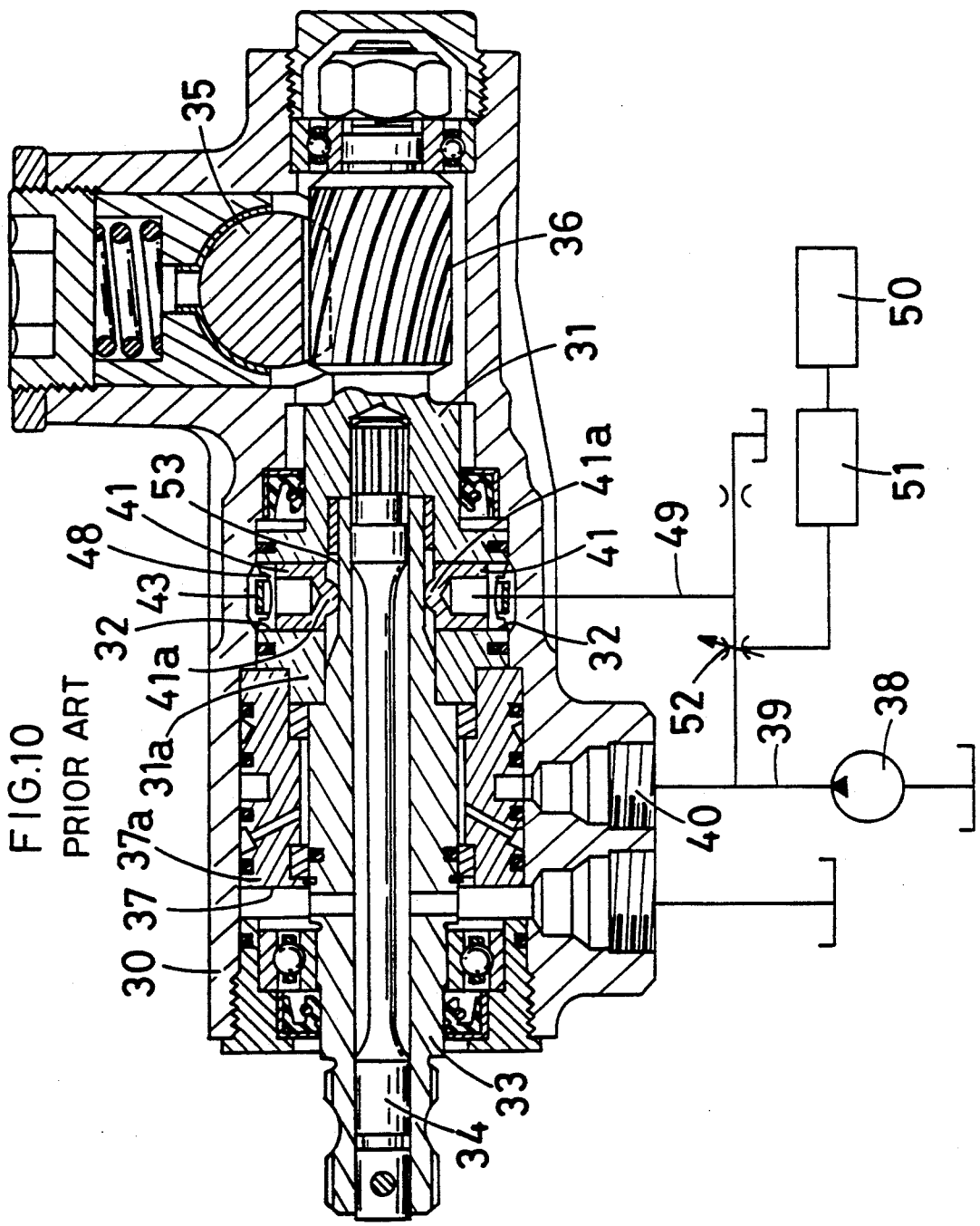
FIG. 10 is a view in vertical section showing the overall construction of a conventional vehicle speed responsive hydraulic power steering device.
Figure 11:
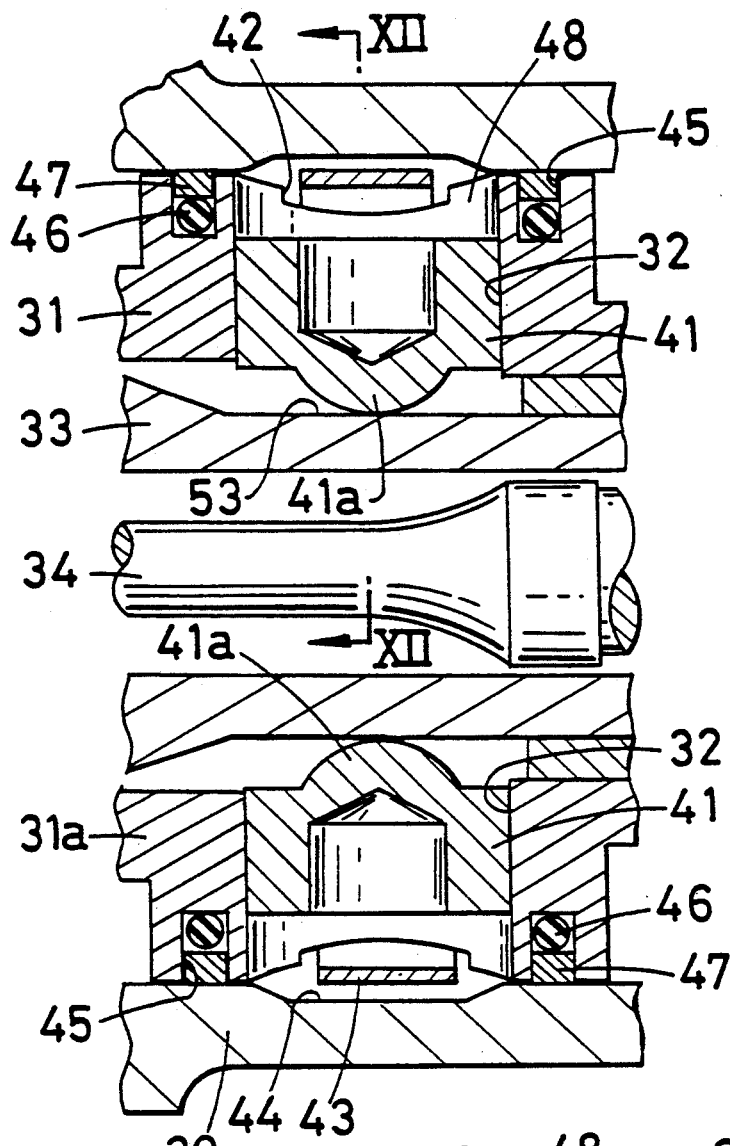
FIG. 11 is an enlarged fragmentary view of FIG. 10.
Figure 12:
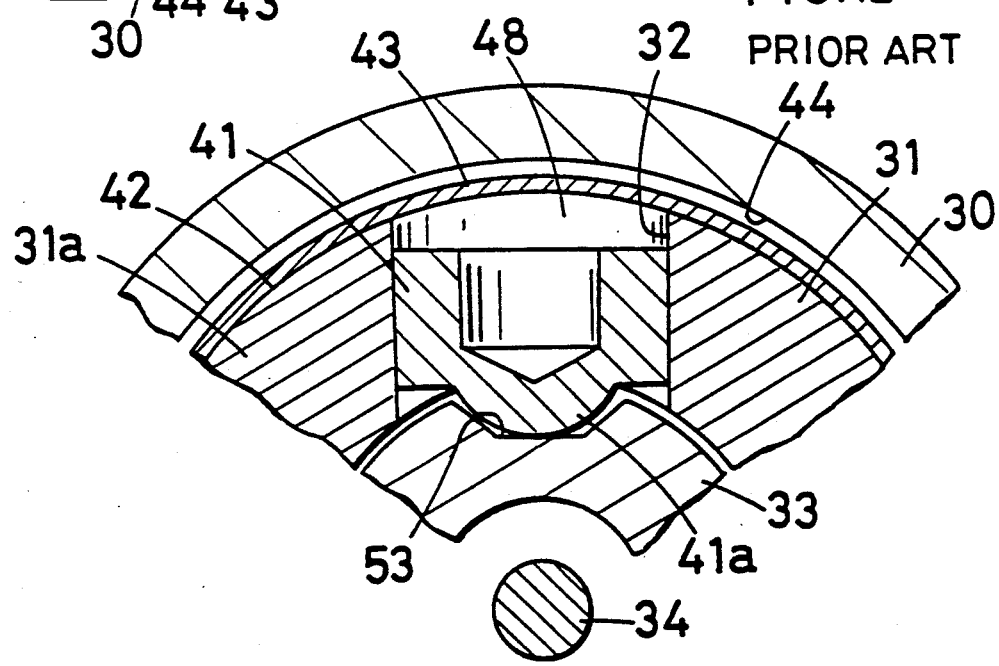
FIG. 12 is an enlarged view in section taken along the line XII—XII in FIG. 11.
Figure 13:
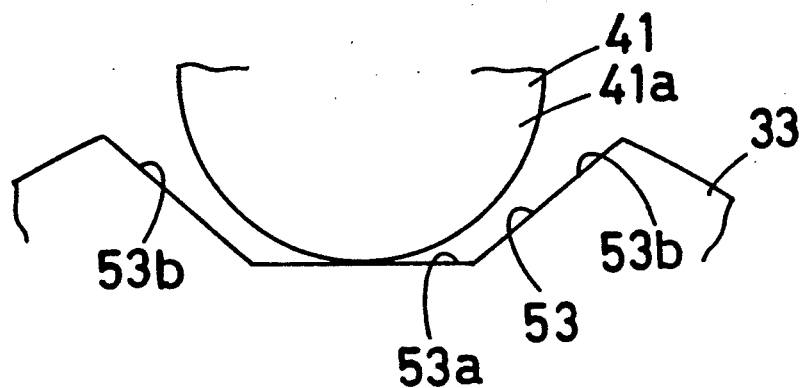
FIG. 13 is an enlarged view showing a portion of FIG. 12 without hatching.

FIG. 5 shows a fifth embodiment of the invention. The vehicle speed responsive hydraulic power steering device of FIG. 5 includes plungers 15 each comprising a synthetic resin body 16 in the form of a hollow cylinder closed at one end thereof closer to the input shaft 33, and an annular metal body 17 secured to the periphery of the resin body 16 and having an outer peripheral surface slidable in contact with the inner peripheral surface of the output shaft 31 defining the hole 32. The closed end of the resin body 16 is projected beyond the corresponding end of the annular metal body 17 to provide a spherical protuberance 16a, which serves as the portion to be contacted with the surface of the input shaft 33 defining the furrow 53. The other end of the resin body 16 is also projected beyond the metal body 17, and the projected end is provided around its periphery with a cover portion 16b covering the other end of the metal body 17. The other end of the resin body 16 opposite to its protuberance 16a is formed with a cavity 16c for reducing the weight of the resin body. Except for the feature described above, the fifth embodiment has the same construction as the conventional power steering device described.

With the power steering device described above, the cover portion 16b serves to diminish the striking noise to be produced when the plunger 15 moves away from the input shaft 33 into contact with the ring 43. Except for this advantage, the present embodiment has the same advantages as the fourth embodiment.

The plungers of the fourth and fifth embodiments are prepared, for example, by molding a synthetic resin inside the annular metal body as joined with the metal body by injection molding, and finishing the molding as by polishing.

FIG. 6 shows a sixth embodiment of the invention. The vehicle speed responsive hydraulic power steering device of FIG. 6 includes plungers 19 each comprising a solid cylindrical body 20 of a synthetic resin such as fiber-reinforced nylon 66 filled with glass fiber, and an annular metal body 21 secured to the periphery of the resin body 20 and made, for example, of JIS SUJ2 as hardened or a sintered alloy. The outer peripheral surface of the annular metal body 21 is slidable in contact with the inner peripheral surface of the output shaft 31 defining the hole 32.

One end of the synthetic resin body 20 closer to the input shaft 33 is projected in its entirety beyond the annular metal body 21 to provide a spherical protuberance 20a, which serves as the portion to be contacted with the bottom surface 53a and the side surfaces 53b defining the furrow 53 in the input shaft 33. The other end of the resin body 20 is caved in from the corresponding end of the annular metal body 21 form a recess 20b larger than the spherical protuberance 20a and having such a size that the protuberance 20a can be fitted in the recess. The recessed end of the resin body 20 has a concave surface. A cavity 20c for reducing the weight of the plunger extends from the central portion of the concave surface toward the protuberance 20a. An annular projection 21a is formed on the inner periphery of the metal body 21 for preventing the resin body 20 from slipping off. Except for the above feature, the sixth embodiment has the same construction as the conventional power steering device described.

Like the plungers of the fourth and fifth embodiments, the plunger 19 is prepared, for example, by molding the synthetic resin body 20 inside the annular metal body 21 as joined thereto. As shown in FIG. 7, a plurality of such plungers 19 are fitted together by placing the protuberance 20a of the resin body 20 of each plunger 19 into the recess 20b of the resin body 20 of another plunger 19, and the outer peripheral surfaces of the metal bodies 21 of all the plungers 19 are polished at the same for finishing, for example, by a centerless polishing device. The plungers 19 can therefore be prepared easily. Except for the above advantage, the present embodiment has the same advantages as the fourth embodiment.

FIG. 8 shows a seventh embodiment of the invention. The vehicle speed responsive hydraulic power steering device of FIG. 8 includes plungers 23 each comprising a solid cylindrical body 24 of a synthetic resin such as fiber-reinforced nylon 66 filled with glass fiber, and an annular metal body 25 fixedly fitted around the resin body 24 and made, for example, of JIS SUJ2 as hardened or a sintered alloy. One end of the synthetic resin body 24 closer to the input shaft 33 is projected beyond the corresponding end of the metal body 25 to provide a spherical protuberance 24a, which serves as the portion to be contacted with the bottom surface 53a and the side surfaces 53b defining the furrow of the input shaft 33. The peripheral edge of the spherical protuberance 24a extends radially outward to provide a flange 24b. The other end of the resin body 24 is at a lower level than the metal body 25. An annular projection 25a having a predetermined width from the base end of the protuberance 24a is formed on the inner periphery of the metal body 25. The inner periphery of the metal body 25 above the annular projection 25a toward the other end provides a relief 25b for the resin body 24 when the body 24 thermally expands. With the exception of the above feature, the present embodiment has the same construction as the conventional power steering device described.

When the resin body 24 of the power steering device thermally expands into the relief 25b, the expanding portion of the resin body 24 comes into engagement with the annular projection 25a. Further the pressure oil, when introduced into the pressure oil chamber 48, gives the plunger 23 a pressure acting to move the plunger radially inward. The resin body 24 is then subjected to a force acting to move the body 24 out of the annular metal body 25, whereas the metal body 25 is also subjected to a force acting in the same direction at this time, while the expanding portion in the relief 25b engages with the annular projection 25a. Consequently, the resin body 24 is prevented from slipping off. Except for the above advantage, the present embodiment has the same advantages as the fourth embodiment.

The plunger 23 is prepared by forming the annular metal body 25, making the resin body 24 by injection molding separately from the metal body, and forcing the other end, opposite to the protuberance 24a, of the resin body 24 into the metal body 25 to bring the flange 24b into engagement with the metal body 25.

As a process for preparing the plunger 23 comprising the resin body 24 and the annular metal body 25 fitted therearound, it appears feasible to mold the resin body 24 inside the metal body 25 as joined thereto by injection molding. This process nevertheless involves the necessity of making the outer periphery of the annular metal body 25 serve as a reference surface so as to preclude the misalignment of the resin body 24 with the metal body 25, hence the need to position the outer periphery of the metal body 25 in intimate contact with the injection molding die. Accordingly, in the case where annular metal bodies 25 of varying outside diameters are necessary because different reaction pressures are required of different kinds of vehicles, many kinds of dies must be prepared in conformity with the varying outside diameters of the metal bodies 25 to result in an increased cost. However, when the plunger 23 is prepared by fitting the annular metal body 25 around the resin body 24, the outside diameter of the plunger 23 can be altered merely by varying the wall thickness of the metal body 25 without varying the size of the resin body 24. Although synthetic resin molding dies are expensive, only one kind of such dies therefore needs to be prepared, hence a cost reduction.

Although the power steering devices described above are of the rack-pinion type, the present invention is also applicable to power steering devices of the ball screw type.

According to the embodiments described, the plunger is axially slidably fitted in a hole formed in a tubular portion of the output shaft and extending radially thereof, whereas the present invention is not limited to such arrangement but is also applicable to a device which comprises, as disclosed in Unexamined Japanese Utility Model Publication SHO 63-75471, an input shaft integrally formed with radially extending projections, an output shaft having bores extending perpendicular to its axis and positioned on the axially opposed sides of the projections, and plungers slidably fitted in the respective bores to hold the projections between the opposed plunger ends to deliver a hydraulic reaction.

What is claimed is:

1. A hydraulic power steering device responsive to the speed of a vehicle comprising:
a housing;
an output shaft disposed in the housing, the output shaft having an inner peripheral surface defining a hole in the output shaft;
an input shaft disposed in the housing band being coaxial with the output shaft;
a torsion bar provided between the output shaft and the input shaft;

a control valve provided around the input shaft for controlling the amount of pressure oil to be supplied from a hydraulic pump to a power cylinder in accordance with the torsion of the torsion bar; and plungers made entirely of a synthetic resin, each plunger being slidably fitted in said hole-defining inner peripheral surface of the output shaft so that at least a portion of each plunger is slidably in contact with the inner hole-defining peripheral surface of the output shaft and each plunger has a forward end adapted to be pressed against the input shaft by oil pressure in accordance with the vehicle speed to obtain a reaction.

2. A hydraulic power steering device responsive to the speed of a vehicle comprising:

a housing;

an output shaft disposed in the housing, the output shaft having an inner peripheral surface which defines a hole in the output shaft;

an input shaft disposed in the housing and being coaxial with the output shaft;

a torsion bar provided between the output shaft and the input shaft;

a control valve provided around the input shaft for controlling the amount of pressure oil to be supplied from a hydraulic pump to a power cylinder in accordance with the torsion of the torsion bar;

a plurality of plungers each comprising a synthetic resin body having a portion in slidable contact with the hole-defining inner peripheral surface of the output shaft; and the synthetic resin body of each plunger having a metal ball fixed in its forward end and positioned to be pressed against the input shaft by oil pressure in accordance with the vehicle speed to obtain a reaction.

3. A hydraulic power steering device responsive to the speed of a vehicle as recited in claim 2 wherein said metal balls are rollably supported in their respective plungers.

4. A hydraulic power steering device responsive to the speed of a vehicle comprising:

a housing;

an output shaft disposed in the housing, the output shaft having an inner peripheral surface which defines a hole in the output shaft;

an input shaft disposed in the housing and being coaxial with the output shaft;

a torsion bar provided between the output shaft and the input shaft;

a control valve provided around the input shaft for controlling the amount of pressure oil to be supplied from a hydraulic pump to a power cylinder in accordance with the torsion of the torsion bar;

and a plurality of plungers each comprising a synthetic resin body and an annular metal body secured to the periphery of the synthetic resin body, each plunger being slidably fitted in the hole-defining inner peripheral surface of the output shaft, so that an outer peripheral surface of each metal body is in slidable contact with the hole-defining inner peripheral surface of the output shaft, one end of the synthetic resin body closer to the input shaft being projected beyond one end of the annular metal body closer to the input shaft to provide a protuberance for contact with the input shaft so that said protuberance is pressed against the input shaft by oil pressure in accordance with the vehicle speed to obtain a reaction and wherein an opposite end of said synthetic resin body of each plunger is formed with a recess dimensioned to be capable of matingly receiving the protuberance of an adjacent plunger when two of said plungers are axially aligned.

5. A hydraulic power steering device responsive to the speed of a vehicle comprising:

a housing;

an output shaft disposed in the housing, the output shaft having an inner peripheral surface which defines a hole in the output shaft;

an input shaft disposed in the housing and being coaxial with the output shaft;

a torsion bar provided between the output shaft and the input shaft;

a control valve provided around the input shaft for controlling the amount of pressure oil to be supplied from a hydraulic pump to a power cylinder in accordance with the torsion of the torsion bar;

and a plurality of plungers each comprising a synthetic resin body and an annular metal body secured to the periphery of the synthetic resin body, said synthetic resin body of the plunger being formed inside the annular metal body by injection molding, each plunger being slidably fitted in the hole-defining inner peripheral surface of the output shaft, so that an outer peripheral surface of each metal body is in slidable contact with the hole-defining inner peripheral surface of the output shaft, one end of the synthetic resin body closer to the input shaft being projected beyond one end of the annular metal body closer to the input shaft to provide a protuberance for contact with the input shaft, said protuberance being pressed against the input shaft by oil pressure in accordance with the vehicle speed to obtain a reaction.

6. A hydraulic power steering device responsive to the speed of a vehicle comprising:

a housing;

an output shaft disposed in the housing, the output shaft having an inner peripheral surface which defines a hole in the output shaft;

an input shaft disposed in the housing and being coaxial with the output shaft;

a torsion bar provided between the output shaft and the input shaft;

a control valve provided around the input shaft for controlling the amount of pressure oil to be supplied from a hydraulic pump to a power cylinder in accordance with the torsion of the torsion bar; and a plurality of plungers each comprising a synthetic resin body and an annular metal body having a generally cylindrical axial opening including an annular radial projection at an end facing the input shaft and in which a portion of said synthetic resin body is received, and secured by pressing engagement with said annular projection, and an outer peripheral surface of said annular metal body being in slidable contact with said inner peripheral surface of said hole; and wherein each synthetic resin body includes a forward end located closer to the input shaft, the forward end being a protuberance positioned externally of said annular metal body and having a flange portion having a diameter exceeding the diameter of said axial opening of said annular and metal body adapted to be pressed against the input shaft by oil pressure in accordance with the vehicle speed to obtain a reaction; and wherein said generally cylindrical axial opening is dimensioned to provide a clearance space and a rearward end portion of said resin body positioned on an opposite side of said annular radial projection from said forward end so as to provide sufficient volume to accommodate thermal expansion of said synthetic resin body.

7. A hydraulic power steering device responsive to the speed of a vehicle as recited in claim 6 wherein the synthetic resin body of each plunger does not extend through the entire length of the axial opening in the annular metal body in which the synthetic resin body is mounted so as to provide further relief space for permitting said thermal expansion of said synthetic resin body so as to enhance retention of said synthetic resin body in said annular metal body.

8. A hydraulic power steering device responsive to the speed of a vehicle as recited in claim 7 wherein said protuberance includes a flange portion located at the forward end of the synthetic resin body, the flange portion having an outer diameter greater than the diameter of the axial opening in the annular metal body, and constituting the largest diameter portion of the protuberance.

* * * * *